United States Patent
Roba et al.

(10) Patent No.: US 7,047,158 B2
(45) Date of Patent: May 16, 2006

(54) METHOD AND DEVICE FOR MONITORING THE PERFORMANCE OF INDUSTRIAL EQUIPMENT

(75) Inventors: Thierry Roba, Boneffe (BE); Caroline Drouart, Chatillon (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/508,461

(22) PCT Filed: Mar. 17, 2003

(86) PCT No.: PCT/FR03/00845

§ 371 (c)(1),
(2), (4) Date: Mar. 28, 2005

(87) PCT Pub. No.: WO03/079128

PCT Pub. Date: Sep. 25, 2003

(65) Prior Publication Data

US 2005/0165581 A1    Jul. 28, 2005

(30) Foreign Application Priority Data

Mar. 20, 2002   (FR) .................. 02 03454

(51) Int. Cl.
*G06F 19/00* (2006.01)

(52) U.S. Cl. .......................... 702/182; 62/125
(58) Field of Classification Search ............... 702/182, 702/183–185, 188; 62/125, 129, 166, 190
See application file for complete search history.

(56) References Cited

U.S. PATENT DOCUMENTS

| 4,325,223 A | 4/1982 | Cantley |
| 5,481,481 A * | 1/1996 | Frey et al. ............ 702/82 |
| 2001/0034582 A1 | 10/2001 | Umezawa et al. |
| 2004/0093879 A1 * | 5/2004 | Street et al. ............ 62/151 |

FOREIGN PATENT DOCUMENTS

EP    516 534    12/1992

OTHER PUBLICATIONS

International Search Report for PCT/FR03/00845.

* cited by examiner

Primary Examiner—Patrick Assouad
Assistant Examiner—Edward Raymond
(74) Attorney, Agent, or Firm—Linda K. Russell

(57) ABSTRACT

A method and an apparatus for automatically monitoring the performance of industrial equipment during its operation. During this monitoring, various operating parameters of the equipment are measured, a performance factor representative of the equipments operation is calculated, and information is indicated to a user as a function of the performance factor. Automatic calibration of the performance factor calculation may be performed at the request of a user.

14 Claims, 3 Drawing Sheets

METHOD AND DEVICE FOR MONITORING THE PERFORMANCE OF INDUSTRIAL EQUIPMENT

BACKGROUND

The invention relates to a method for automatically monitoring the performance of industrial equipment and to a device for implementing this method.

One field of application of the invention is for oxygen production units using one or more air, oxygen or nitrogen compressors to separate the components of air.

By monitoring the performance of the industrial equipment, the maintenance of the latter can be planned and its productivity checked. Thus, it is generally found that the benefits of an industrial equipment optimization project are often reduced to nothing after a few years if there is no monitoring that allows the slightest drift in the operation of this industrial equipment to be detected and corrected.

Thus, the operator of the industrial equipment desires to have an industrial equipment performance indicator that reliably reflects any deterioration in the equipment. Thus, it is necessary to be able to distinguish between deterioration of the industrial equipment and a simple variation in its operating conditions.

Document EP-B 516 534 describes a method of monitoring an apparatus operating under variable conditions, delivering a normalized performance parameter which is, for a gas turbine compressor that drives an alternator supplying an electric power distribution network, an air flow rate or a polytropic efficiency. This method uses a quantified model of the behavior of the apparatus to be monitored, established experimentally from measurements made on the apparatus when it is in a known internal state, for example when it is new. The measurements are made on influence parameters representative of variable conditions of external origin in which the apparatus is made to operate, such as the atmospheric pressure, the ambient temperature, the ambient humidity, the flow rate of a fuel feeding the turbine, the composition of the fuel, the temperature of the fuel, the thermal stabilization state of the turbine with its compressor and the frequency of the electric power distribution network. However, this model is not suitable for monitoring the performance of the aforementioned gas production units. In particular, this method does not allow fine monitoring of a performance factor, such as the energy consumption or the isothermal efficiency of a compressor, this being barely correlated with the aforementioned influence parameters.

SUMMARY

The aim of the invention is to obtain a method and a device for automatically monitoring the performance of industrial equipment that alleviate the drawbacks of the prior art.

For this purpose, a first subject of the invention is a method for automatically monitoring the performance of industrial fluid protection equipment comprising a refrigerated compressor during the operation of the industrial fluid protection equipment, in which:

operating parameters of the industrial equipment are measured using measurement means, these parameters comprising at least the flow rate of the gas through the compressor, the pressure of the gas entering the compressor, the pressure of the gas leaving the compressor, the temperature of the coolant for the compressor;

a performance factor representative of the operation of the industrial equipment is calculated, using calculation means, from the measured parameters and from a calculation rule stored in storage means; and performance monitoring information as a function of the calculated performance factor is indicated to a user by indication means.

Thanks to the invention, information about the actual conditions existing in the industrial equipment, in which the monitoring method is carried out, is automatically indicated to a user. Thus, the method may be easily implemented by nonexperts. The precision obtained in detecting the deterioration of the state of the industrial equipment is as good as, if not better than, that obtained by the known systems.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
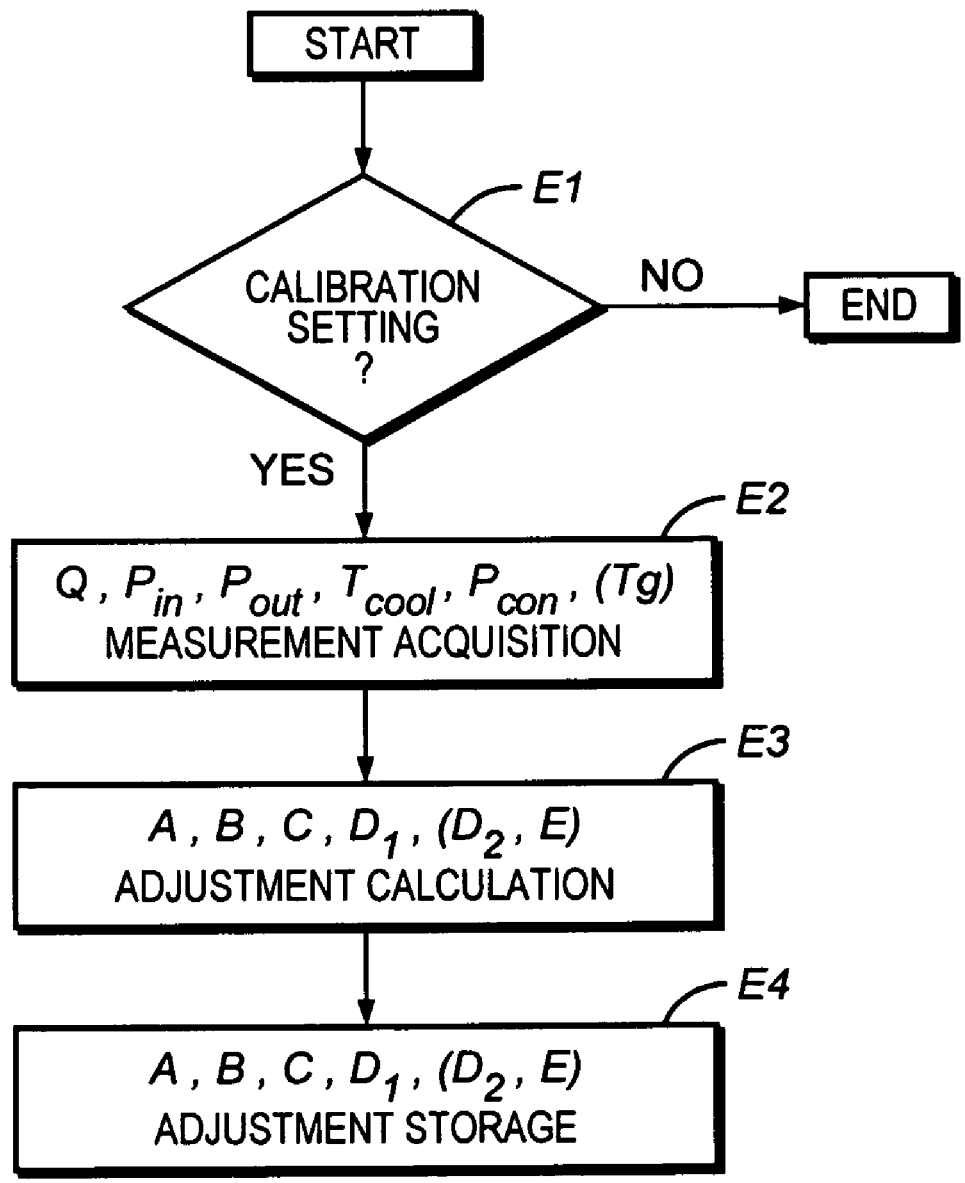
FIG. 1 illustrates one embodiment, in flowchart form, of a calibration phase as per the invention.

The subject of this invention is a method for automatically monitoring the performance of industrial fluid protection equipment comprising a refrigerated compressor during the operation of the industrial fluid protection equipment, in which:

operating parameters of the industrial equipment are measured using measurement means, these parameters comprising at least the flow rate of the gas through the compressor, the pressure of the gas entering the compressor, the pressure of the gas leaving the compressor, the temperature of the coolant for the compressor;

a performance factor representative of the operation of the industrial equipment is calculated, using calculation means, from the measured parameters and from a calculation rule stored in storage means; and performance monitoring information as a function of the calculated performance factor is indicated to a user by indication means.

According to other features of the invention:

during a calibration step, said operating parameters of the industrial equipment are automatically measured, using said measurement means, at least once over the course of time, measured values of the operating parameters are stored in a memory and the calculation rule is calibrated as a function of at least one subset from among the set of measured values of the operating parameters present in the memory, the calibration step being able to be retriggered by the user for a new calibration of said calculation rule;

the rule for calculating the performance factor comprises the calculation of an estimated efficiency $\eta_{est}$ of the compressor according to the following equation:

$$\eta_{est} = AQ + B\frac{P_{out}}{P_{in}} + CT_{cool} + D_2 T_g + E$$

in which Q is the flow rate of the gas through the compressor, $P_{in}$ is the pressure of the gas entering the compressor,
$P_{out}$ is the pressure of the gas leaving the compressor,
$T_{cool}$ is the temperature of the coolant for the compressor,
A, B, C, D2 and E are predetermined adjustment parameters, the temperature $T_g$ of the gas entering the compressor being measured, using measurement means, for the chosen nonzero adjustment parameter D2;

the performance factor corresponds to an estimated energy consumption $P_{est}$ of the compressor according to the following equation:

$$P_{est} = [QRT_{cool} \times ln(P_{out}/P_{in})]/\eta_{est};$$

the adjustment parameters A, B, C, D2, E are calculated by linear regression from the at least one subset of measured values of the operating parameters present in the memory;

the calculation rule is determined on the basis of a neural network, the self-learning of which is achieved on the basis of the at least one subset of measured values of the operating parameters present in the memory, the adjustment parameters A, B, C, D, E disappearing when a neural network is used;

the calibration step is carried out on command by the operator, for example after a compressor maintenance operation;

the calculated performance factor is used to trigger an alarm when the calculated performance factor does not meet the prescribed conditions.

A second subject of the invention is a device for implementing the method for automatically monitoring the performance of industrial fluid production equipment, characterized in that it comprises means for measuring said operating parameters, means for calculating said performance factor from the calculation rule present in the storage means and from the measurements supplied by the measurement means, and means for indicating performance monitoring information to a user on the basis of the calculated performance factor.

According to one feature, the device includes a calculation rule calibration command means.

In the figures, it is firstly determined, during the prior step E1, whether or not a new calibration setting is required. This inquiry is performed by means of a physical or logic command button 1 on the device, for example in the form of a command key on a computer screen. Actuating the button 1 resets the calibration by passing to steps E2, E3, which will be described below.

The monitoring device 2 is intended to be fitted onto one or more compressors 3 used in the industrial equipment. The compressor 3 comprises a gas inlet 4 and a gas outlet 5, the gas being compressed by a compression means contained in the compressor 3. The compressor 3 is cooled by a cooling circuit 6 through which a coolant, such as water for example, circulates. A pressure sensor 7, called the inlet pressure sensor, is mounted on the inlet 4 in order to measure the pressure of the gas entering the compressor 3. A flow rate sensor 8 is mounted on the inlet 4 in order to measure the flow rate of the gas entering the compressor 3. Of course, the sensor 8 may also be mounted on the outlet 5 in order to measure the flow rate of the emerging gas, instead of being mounted on the inlet 4. A sensor 9, called the outlet pressure sensor, is mounted on the outlet 5 in order to measure the pressure of the gas leaving the compressor 3. A temperature sensor 10 is mounted on the cooling circuit 6 in order to measure the temperature of the coolant. A sensor 10a for measuring the energy consumption of the compressor is also provided, for example a consumed electric power sensor 10a. If necessary, it is possible to provide an additional sensor 10b on the inlet 4 of the compressor 3, allowing the temperature $T_g$ of the incoming gas to be measured. Also provided on the compressor 3 is a sensor 10c for detecting the open or closed position $Z_v$ of a venting valve.

The sensors 7, 8, 9, 10, 10a, 10c and, where appropriate, 10b are connected to a measurement reception unit 10d, in which the limits G for each of the measured quantities, for example a maximum threshold $S_{max}$ and a minimum threshold $S_{min}$ for the ranges of values, may be entered. In the measurement reception unit 10d, the values of the aforementioned parameters, namely the incoming gas pressure $P_{in}$, the gas flow rate Q, the outgoing gas pressure $P_{out}$, the coolant temperature $T_{cool}$, the energy consumption $P_{con}$, the position $Z_v$ of the venting valve and, where appropriate, the temperature $T_g$ of the incoming gas, which values are received from the sensors 7, 8, 9, 10, 10a, 10c, 10b, are selected using the limits G. The selection is made for example by filtering with respect to the prescribed value limits G for each parameter and by eliminating values that lie outside these limits. These limits are, for example, predetermined ranges of numerical values $S_{min}$ to $S_{max}$, dependent on the sensors 7, 8, 9, 10a, 10b and on the compressor 3. The measurement reception unit 10d includes one or more measurement quality indicators $I_1$, for example an indicator of the number or percentage of measurements not falling within the limits G.

When the command button 1 has been pressed, the procedure carries out, during the next step E2, the acquisition of measurements of the incoming gas pressure $P_{in}$, the incoming or outgoing gas flow rate Q, the outgoing gas pressure $P_{out}$, the coolant temperature $T_{cool}$, the energy consumption $P_{con}$, the position $Z_v$ of the venting valve and, where appropriate, the temperature $T_g$ of the incoming gas, these being delivered by the measurement reception unit 10d from the corresponding sensors 7, 8, 9, 10a, 10c, 10b, in a memory 11 of an automatic calibration unit 11a. A subset of parameter measurements from among the set of measurements received by the sensors is thus provided by the measurement reception unit 10d.

The memory 11 is capable of storing, for each parameter $P_{in}$, Q, $P_{out}$, $T_{cool}$, $P_{con}$, $Z_v$ and, where appropriate $T_g$, several measured values delivered in succession by the measurement reception unit 10d, for example every hour or at some other frequency. Recorded in the memory 11 are the measurements made at least once over the course of time, and for example regularly over a given period, for example three months. The amount of data used for the calibration, recorded in the memory 11, is limited to the measurements made during a given period, for example one year.

When a sufficient number of measurements have been acquired in the memory 11, or when a prescribed time period has elapsed since the last time that the command button 1 was pressed, parameters for adjusting a predetermined calculation model or rule for a performance factor of the compressor 3 are calculated, during the next step E3, in a first calculation module 12 of the calibration unit 11a, from the measured parameter or parameters present in the memory 11. As a variant, said parameters for adjusting the predetermined calculation rule for the performance factor of the compressor 3 are calculated on the basis of the last parameter measurements made, which are recorded in the memory 11, and from the previously calculated adjustment parameters by a recursive method, the calibration then being adaptive.

The performance factor is representative of the operation of the industrial equipment and, for example, of the energy consumption of the compressor. The performance factor is for example calculated from a combination of operating parameters $P_{in}$, Q, $P_{out}$, $T_{cool}$ and, where appropriate, $T_g$, especially from a linear combination of one or more of the operating parameters.

The performance factor is, for example, calculated in a linear fashion as a function of the ratio of the outgoing gas pressure to the incoming gas pressure $P_{out}/P_{in}$.

In a first embodiment, the calculation rule for the performance factor comprises the calculation of an estimated efficiency $\eta_{est}$ of the compressor using the following equation (1):

$$\eta_{est} = AQ + B\frac{P_{out}}{P_{in}} + CT_{cool} + D_1. \qquad (1)$$

In another embodiment, the calculation of the performance factor comprises the calculation of an estimated efficiency $\eta_{est}$ of the compressor using the following equation (2):

$$\eta_{est} = AQ + B\frac{P_{out}}{P_{in}} + CT_{cool} + D_2 T_g + E. \qquad (2)$$

The performance factor corresponds, for example, to an estimated energy consumption $P_{est}$ of the compressor using the following equation (3):

$$P_{est} = [QRT_{cool} \times ln(P_{out}/P_{in})]/\eta_{est} \qquad (3)$$

where ln denotes the Naperian logarithm.

In equations (1), (2) and (3), A, B, C, D1, D2 and E are the adjustment parameters. These adjustment parameters are calculated during step E3 in the first calculation module 12, for example by linear regression, on the basis of the selected subset of values present in the memory 11, or from the set of values. In this case, such a model is used only when the measurement reception unit 10d has determined that the position $Z_v$ of the venting valve is closed, in order to prevent fluid from passing therethrough.

In another embodiment, the calculation rule for the performance factor is determined using a neural network present in the first calculation module 12. The self-learning of the neural network is carried out on the basis of the subset of selected values in the memory 11 or of the set of values. Using the neural network, either the performance factor Pest is estimated as a function of the explicative parameters Q, $P_{out}$, $T_{cool}$, $P_{in}$, $Z_v$ and, where appropriate $T_g$, or the performance factor $P_{est}$ is estimated using equation (3), for estimating the efficiency $\eta_{est}$ as a function of the explicative parameters Q, $P_{out}$, $T_{cool}$, $P_{in}$, $Z_v$.

In one embodiment, this neural network serves to partition the space of the explicative parameters, that is to say the aforementioned operating parameters, thereby making it possible to apply a local regression to each region of the space thus partitioned. When the local models have been determined by learning in the calculation module 12, the performance factor is then calculated with reference to these local models.

In another embodiment, the neural network comprises two layers, the first of which is nonlinear and contains a number of neurones close to the number of inputs (for example between three and ten neurones) and the second of which contains the output neurone connected to the first layer.

When the parameters for adjusting the calculation rule for the performance factor, or the performance factor calculation rule itself, have been determined in the first calculation module 12, the rule is stored in storage means 13 of the calibration unit 11a during step E4.

The storage means 13 are interrogable, in order to deliver the adjustment parameters A, B, C, D1 or A, B, C, D2, E contained therein. Thus, the successive acquisition E2 step, adjustment step E3 and storage step E4 constitute one phase of calibrating the calculation rule for the performance factor.

Figure 2:
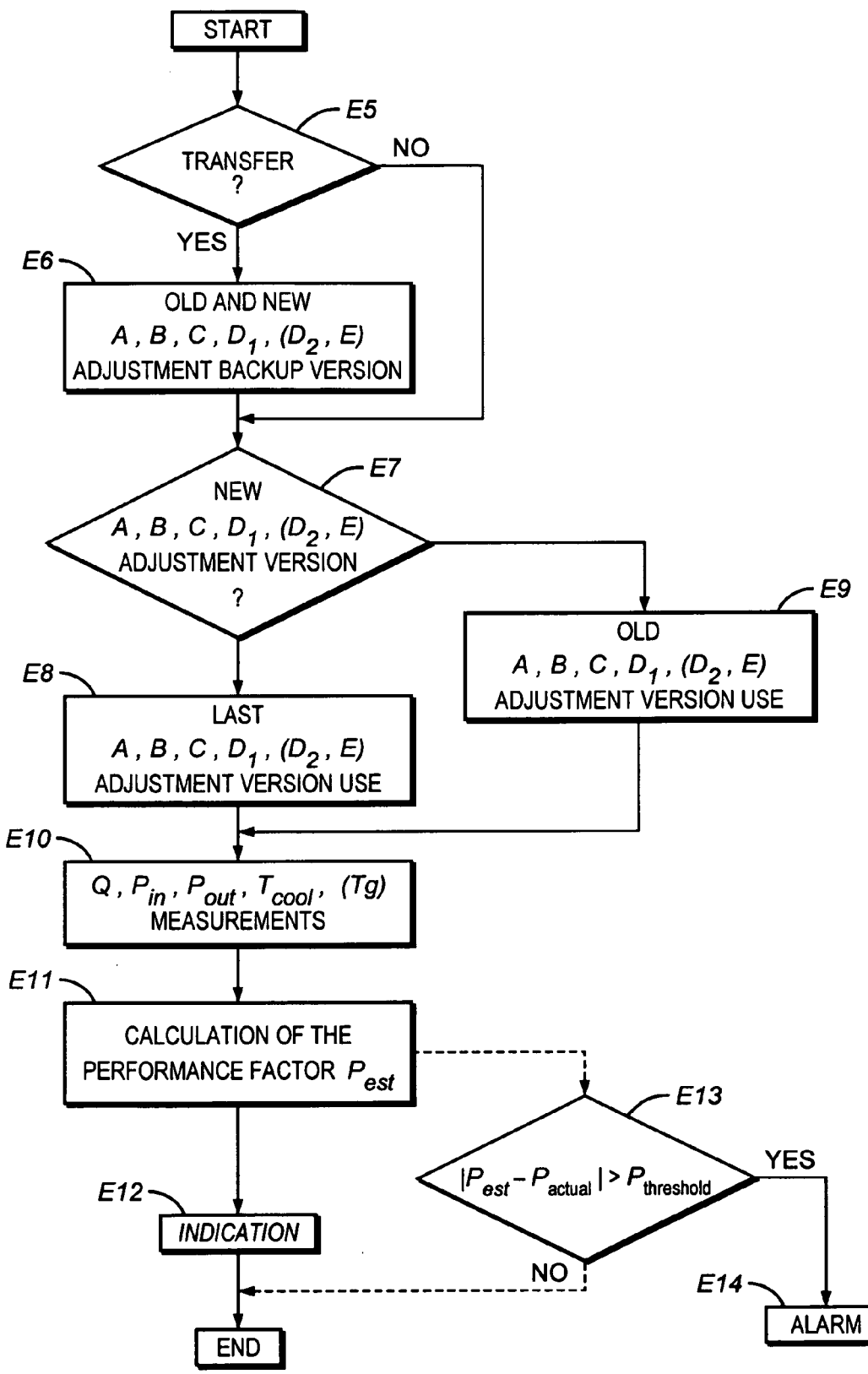
FIG. 2 illustrates one embodiment, in flowchart form, of a prediction phase as per the invention.
Figure 3:
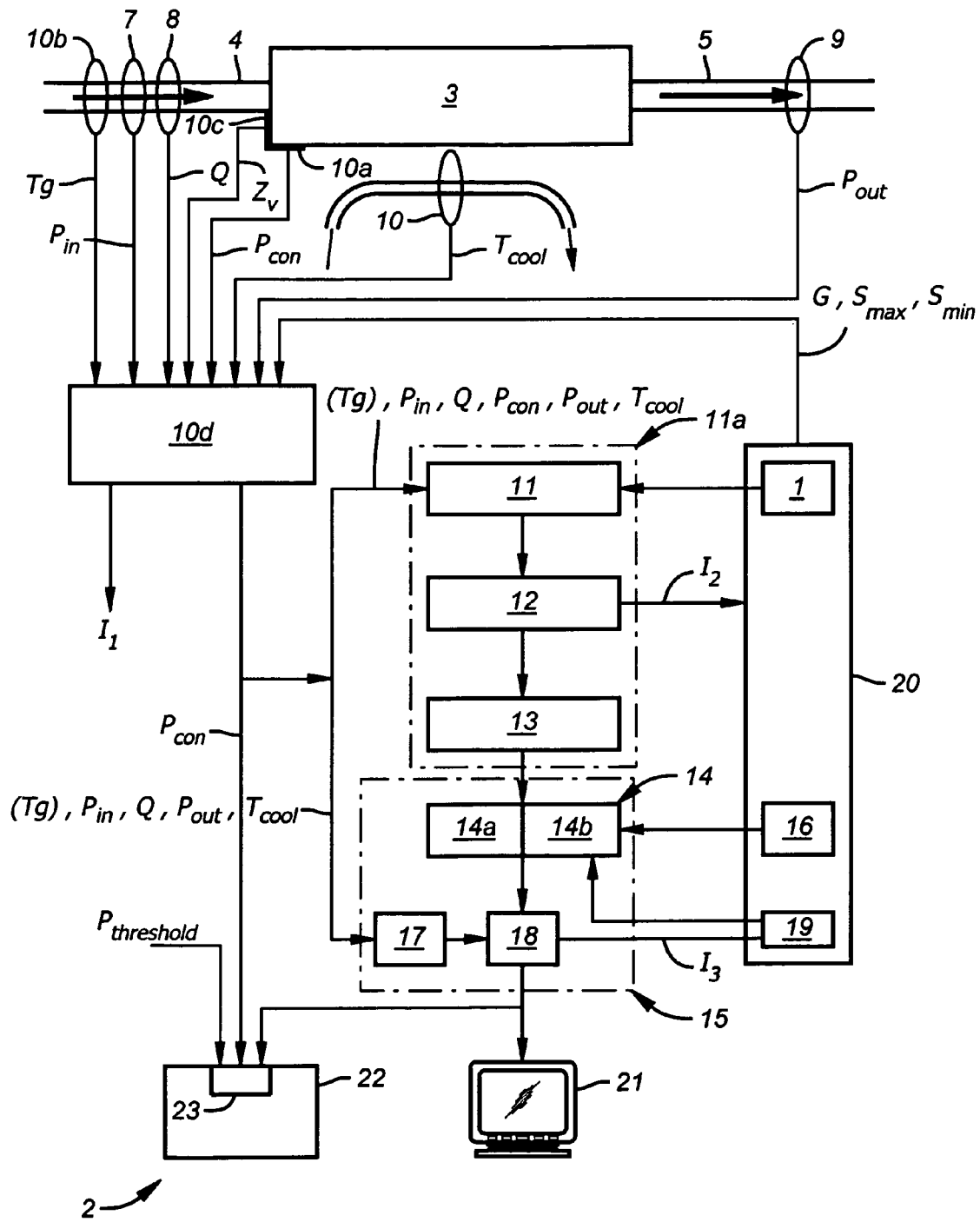
FIG. 3 illustrates a schematic view of one embodiment of a performance monitoring device, as per the invention.

When the calculation model or rule for the performance factor has been calibrated, the performance factor can be automatically calculated as a function of the operating parameters in a prediction unit 14. It is determined, during step E5 in FIG. 2 whether or not the adjustment parameters present in the means 13 have been transferred to an adjustment parameter backup memory 14 of a prediction unit 15. The calculation module 12 includes one or more calibration quality indicators $I_2$ in order to allow a user to decide whether he can transfer, during step E5, the model calibrated in the unit 11a to the prediction unit 15, or whether he must reset the calibration during step E1. For example, the indicator $I_2$ indicates the mean relative modeling error and/or the number of measurement points used for the calibration. This indicator $I_2$ may also give an estimate of the value of the detection threshold associated with the calibrated model.

The backup memory 14 is capable of backing up the adjustment parameters that have just been calculated in the calibration unit 11a and one or more previous versions of these adjustment parameters. A new version of the adjustment parameters is transferred from the storage means 13 to the backup memory 14, during step E6, by acting on a physical or logic command button 16 on the device, for example in the form of a command key on a computer screen. With no transfer of the adjustment parameters present in the means 13 to the backup memory 14, the procedure passes directly to step E7 following step E6.

During step E7, the version of the adjustment parameters that will be received by a calculation module 18, in order to calculate the performance factor, may be selected from the versions of the adjustment parameters that are present in the backup memory 14. For example, stored in the backup memory 14 are the last version and the penultimate version that were calculated from the adjustment parameters in the calibration unit 11a, in parts 14a and 14b thereof. The decision may be made to use either the last version of the adjustment parameters A, B, C, D1 or A, B, C, D1, D2, E during step E8 following step E7, or the old version of the adjustment parameters A, B, C, D1 or A, B, C, D2, E during step E9 following step E7. Storage, during step E8 of a new calculated version of the adjustment parameters in the part 14a causes the old calculated version of the adjustment parameters to be stored in the part 14b. The selection of the version of the adjustment parameters is made, for example, under the command of a third physical or logic command button 19 on the device, for example in the form of a command key on a computer screen.

The first, second and third command buttons 11a, 16, 19 and the input of limits G of the measurement reception unit 10d are present on a command interface 20 of the device, for example one or more computer screen pages or the like.

The prediction unit receives, during step E10 following steps E8 or E9, the current measurement of the aforementioned operating parameters $T_{in}$, Q, $P_{out}$, $T_{cool}$ and, optionally, $T_g$. The same sensors, 7, 8, 9, 10, 10b are used to measure the operating parameters during the acquisition step E2 in order to enter measurements into the memory 11 of the calibration unit 11a and during the measurement step E10 for the prediction unit 15. The measurement sensors 7, 8, 9, 10, 10b are capable of delivering reproducible measurements, that is to say measurement values that are the same for the same operating conditions existing in the compressor 3. Thus, the measurement errors or the biases and offsets inherent in one or more of the sensors 7, 8, 9, 10, 10b are taken into account right from the calibration so as not to influence, to a great extent, the calculation of the performance factor during the calculation step in the prediction unit 15. The reception unit 10d for the sensors 7, 8, 9, 10, 10b is connected in common to the memory 11 and to the prediction unit 14 in order to deliver the measured values of the operating parameters $P_{in}$, Q, $P_{out}$, $T_{cool}$ and, where appropriate $T_g$.

The prediction unit 14 includes an interface 17 for receiving the measurements $P_{in}$, Q, $P_{out}$, $T_{cool}$ and, where appropriate, $T_g$ that are delivered by the reception unit 10d for the sensors 7, 8, 9, 10, 10b.

The storage means 13 and the reception interface 17 are connected to the module 18 for automatically calculating the performance factor as a function of the operating parameters received by the interface 17 and of the calculation rule present in the backup memory 14, during step E11 following step E10.

The performance factor calculated by the calculation module 18 is delivered to user indication means 21, for example of the computer screen type, with digital or other display, in order to be indicated to a user in the form of performance monitoring information, for example the numerical value of the performance factor, during step E12 following step E11.

As a variant or supplement, the calculated performance factor is sent to an alarm trigger module 22 comprising an alarm 23, for example of the audible or message type, triggered when the performance factor calculated by the prediction unit 15 does not satisfy prescribed conditions over a given time. In the above example corresponding to an energy consumption $P_{est}$ as calculated performance factor, these prescribed trigger conditions correspond, for example, to the fact that the difference between or the ratio of the actual energy consumption $P_{con}$ of the compressor and the estimated energy consumption $P_{est}$ exceeds a prescribed energy consumption threshold $P_{threshold}$, the alarm trigger module 22 having for this purpose a comparator 24 that receives, during step E13 following step E11, the calculated performance factor $P_{est}$ coming from the prediction unit 15, the measured actual energy consumption value $P_{con}$ coming from the measurement reception unit 11a and the energy consumption threshold $P_{threshold}$ that may be prescribed via a corresponding input. During step E14 following step E13, the comparator 24 causes the alarm 23 to be triggered in the event of the threshold $P_{threshold}$ being exceeded.

The calculation module 18 includes one or more quality indicators $I_3$ of the model used by the prediction unit 15, for example an indicator of the age of the model or of the mean relative prediction error with respect to the quantities involved in the alarm trigger module 22. The indicator or indicators $I_3$ help the user to decide, should it be necessary, during step E7, to choose the old version or the new version of the calculated model.

The quality indicators $I_1$, $I_2$, $I_3$ are linked to the command interface 20 of the device so as to be able to be presented to the user.

The calibration unit 11a, the memory 11, the first calculation module 12, the storage means 13, the prediction unit 15, the backup memory 14, the reception interface 17, the calculation module 18 and the indication means 21 may be employed by any technical means, for example electronic or computing means, such as a programmed computer.

The calibration and performance-factor calculation phases may be carried out locally on the site of the compressor or remotely, the calibration unit 11a, the prediction unit 15, the indication means 21, the alarm trigger module 22 and the command interface 20 all being provided in this case remote from the compressor and being connected to the other elements via a telecommunication network. Thus, the calibration unit 11a, the prediction unit 15, the indication means 21, the alarm trigger module 22 and the command interface 20 may be provided in a system for centralizing several sites for receiving data in a database. The result of the performance calculation is accessible both locally and remotely.

Thanks to the invention, it is possible to monitor the performance of a compressor with an instrumentation reduced to the minimum necessary for calculating the performance factor or indicator. In particular, it is unnecessary to know the design parameters of the compressor, such as the characteristic curves thereof. The monitoring method and device according to the invention make it possible for any deterioration appearing in the compressor to be detected without requiring precise instrumentation. The method and the device according to the invention make it possible to optimize the compressor maintenance operations and to determine, judiciously, the moment when these operations have to be carried out or if no maintenance operation is to be carried out, thanks to the monitoring of the calculated performance factor. The maintenance costs are thereby reduced, while the productivity of the industrial equipment may thereby be increased, by detecting any deterioration thereof sufficiently early. This allows the maintenance operations to be triggered before further aggravation of the deterioration is observed. The calibration steps E2, E3, E4, E5 in the calibration unit are for example carried out after a maintenance operation. At the same time, the monitoring method and device according to the invention factor out parameters that are not significant with regard to the performance of the compressor.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for automatically monitoring the performance of a refrigerated compressor while it is operating, said method comprising:
   a) measuring the operating parameters of a refrigerated compressor with a measurement means, wherein said operating parameters comprise:

1) the flow rate of a gas through said compressor;
2) the pressure of said gas entering said compressor;
3) the pressure of said gas exiting said compressor; and
4) the temperature of a coolant for said compressor;
b) calculating, with a calculating means, a performance factor representative of the operation of said compressor, wherein said calculating means uses said measured operating parameters and a calculating rule stored in a storage means; and
c) indicating to a user, with an indicating means, performance monitoring information wherein said information comprises a function of said calculated performance factor.

2. The method of claim 1, further comprising a calibration step wherein said calibration step comprises:
   a) automatically measuring said operating parameters with said measurement means at least once;
   b) storing said measured operating parameters in a memory means; and
   c) calibrating said calculation rule as a function of at least one said measured operating parameter located in said memory means.

3. The method of claim 2, wherein said calibration step is capable of being reinitiated by a user for a new calibration of said calculation rule.

4. The method of claim 1, wherein said rule for calculating said performance factor comprises a calculation of an estimated efficiency $\eta_{est}$ of said compressor according to the equation:

$$\eta_{est} = AQ + B\frac{P_{out}}{P_{in}} + CT_{cool} + D_2 T_g + E$$

wherein:
   a) Q represents said flow rate of said gas through said compressor;
   b) $P_{in}$ represents said pressure of said gas entering said compressor;
   c) $P_{out}$ represents said pressure of said gas leaving said compressor;
   d) $T_{cool}$ represents said temperature of said coolant for said compressor;
   e) A, B, C, and E represent predetermined adjustment parameters;
   f) $D_2$ represents a non-zero, predetermined adjustment parameter; and
   g) $T_g$ represents the measured temperature of said gas entering said compressor, as measured by said measurement means.

5. The method of claim 4, wherein said performance factor corresponds to an estimated energy consumption $P_{est}$ of said compressor, according to the following equation:

$$P_{est} = [QRT_{cool} \times ln(P_{out}/P_{in})]/\eta_{est}$$

6. The method of claim 5, wherein said R represents the Universal Gas Constant.

7. The method of claim 5, further comprising calculating said adjustment parameters, by linear regression, from at least one of said measured operating parameters present in said memory means.

8. The method of claim 5, further comprising determining said calculation rule with a neural network means, wherein the self-learning of said neural network means is achieved on the basis of at least one of said measured operating parameters present in said memory.

9. The method of claim 4, wherein said calibration step is carried out on command by a user.

10. The method of claim 1, further comprising triggering an alarm when said calculated performance factor does meet prescribed conditions.

11. The method of claim 1, wherein said operating parameters further comprise the temperature of said gas entering said compressor.

12. An apparatus which maybe used for automatically monitoring the performance of a refrigerated compressor while it is operating, wherein:
   a) said apparatus comprises:
      1) a measuring means suitable to measure the operating parameters of a refrigerated compressor, wherein said operating parameters comprise:
         i) the flow rate of a gas through said compressor;
         ii) the pressure of said gas entering said compressor;
         iii) the pressure of said gas exiting said compressor; and
         iv) the temperature of a coolant for said compressor;
      2) a storage means suitable to store a calculation rule;
      3) a calculating means suitable to calculate a performance factor representative of the operation of said compressor from said calculation rule stored in said storage means and from said measured operating parameters; and
      4) an indicating means suitable to indicate information for monitoring the performance of said compressor; and
   b) said automatically monitoring the performance of said refrigerated compressor comprises:
      1) measuring said operating parameters with said measurement means;
      2) calculating, with said calculating means, said performance factor; and
      3) indicating, with said indication means, performance monitoring information to a user wherein said information comprises a function of said calculated performance factor.

13. The apparatus of claim 12, further comprising a means to initiate a calculation rule calibration, wherein said calculation rule calibration comprises:
   a) automatically measuring said operating parameters with said measuring means at least once;
   b) storing said measured operating parameters in a memory means; and
   c) calibrating said calculation rule as a function of at least one said measured operating parameter located in said memory means.

14. The apparatus of claim 12, wherein said operating parameters further comprise the temperature of said gas entering said compressor.

* * * * *